United States Patent [19]
Kirkpatrick et al.

[11] Patent Number: 5,631,715
[45] Date of Patent: May 20, 1997

[54] STACKABLE MODULAR PROJECTION TELEVISION DISPLAY SYSTEMS

[75] Inventors: John R. Kirkpatrick, Kitchener; Ian B. Forbes, Campbellville; Alexander Duthie, Kitchener; Daryl R. Cober, Baden, all of Canada

[73] Assignee: Sure Audio Visual Excellence Inc., Waterloo, Canada

[21] Appl. No.: 414,737

[22] Filed: Mar. 31, 1995

[51] Int. Cl.$^6$ .................................................... H04N 5/64
[52] U.S. Cl. .................................................... 348/839
[58] Field of Search .................................... 348/825, 826, 348/827, 787, 789, 794, 839; 312/7.2

[56] References Cited

U.S. PATENT DOCUMENTS

| | | | |
|---|---|---|---|
| 3,770,889 | 11/1973 | Gutschick et al. | 178/7.8 |
| 4,662,531 | 5/1987 | Ramspacher et al. | 312/7.2 |
| 4,836,625 | 6/1989 | Catta | 312/7.2 |
| 5,087,010 | 2/1992 | Walters | 312/7.2 |
| 5,293,244 | 3/1994 | Kawaguchi | 312/7.2 |

*Primary Examiner*—Edward L. Coles, Sr.
*Assistant Examiner*—Jerome Grant II
*Attorney, Agent, or Firm*—R. Craig Armstrong

[57] ABSTRACT

A video display unit has a box defined by peripheral frame members along each edge thereof, the box having front, rear, top, bottom and two side faces. Abutment surfaces are located on the peripheral frame members along the top and sides, for abutting corresponding abutment surfaces of other such display units. A video projector is mounted in a lower portion of the box, to project an image upwardly. A mirror is mounted in an upper portion of the box, angled to direct the image from the video projector forwardly towards an upper portion of the front face of the box. Three detachable mullions, namely an upper mullion and two side mullions, are mounted along top and side edges of the front face and extend slightly forwardly and outwardly therefrom. The mullions having longitudinal channels running the length thereof on opposite sides thereof, the mullions being symmetrical about longitudinal axes, the axes being parallel to the front face and aligned with respective ones of the abutment surfaces. A rectangular screen is mounted across the upper front portion of the front face, to receive the image from the video projector via the mirror, the screen extending across the front face between the mullions and being positioned in the channels. A locating and locking channel is provided along a lower edge of the screen, for locating and locking the screen into the channels of the upper and side mullions.

5 Claims, 14 Drawing Sheets

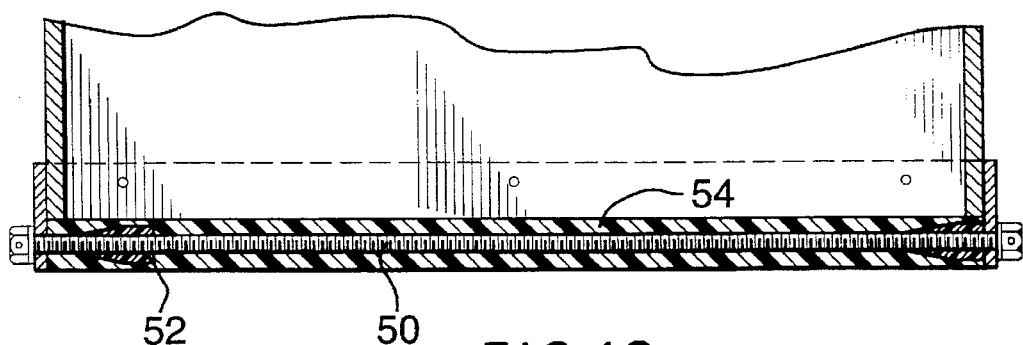
FIG.18
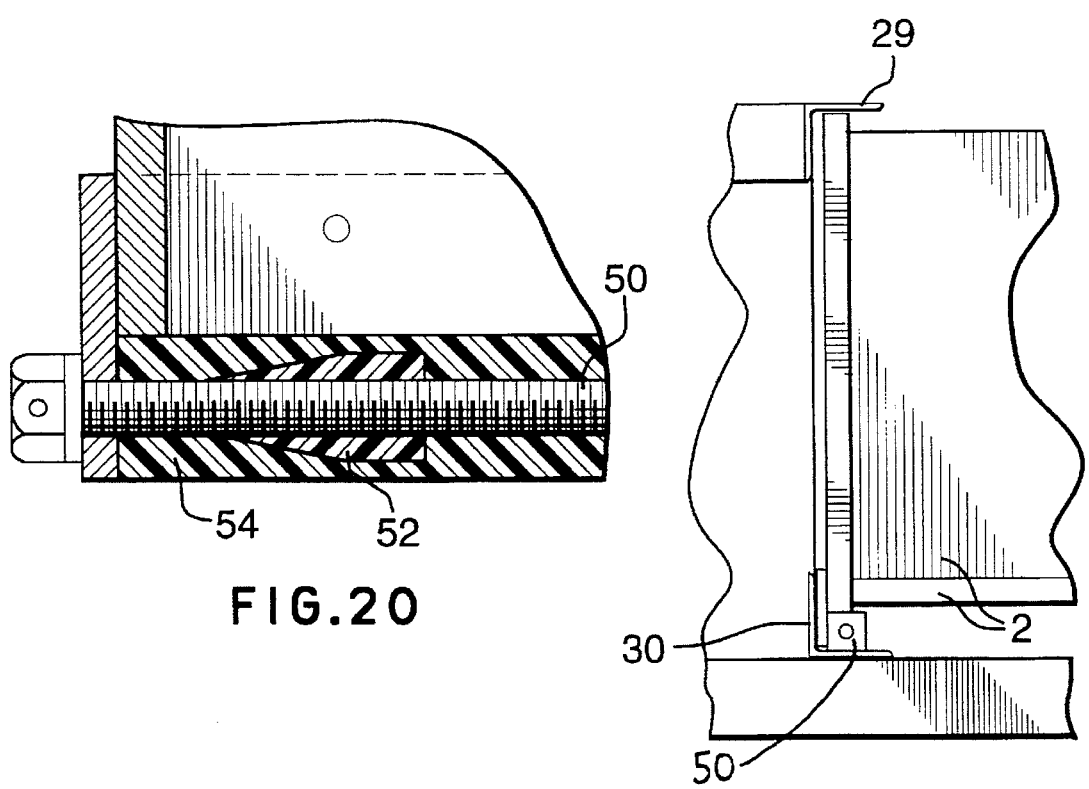
FIG.20
FIG.19
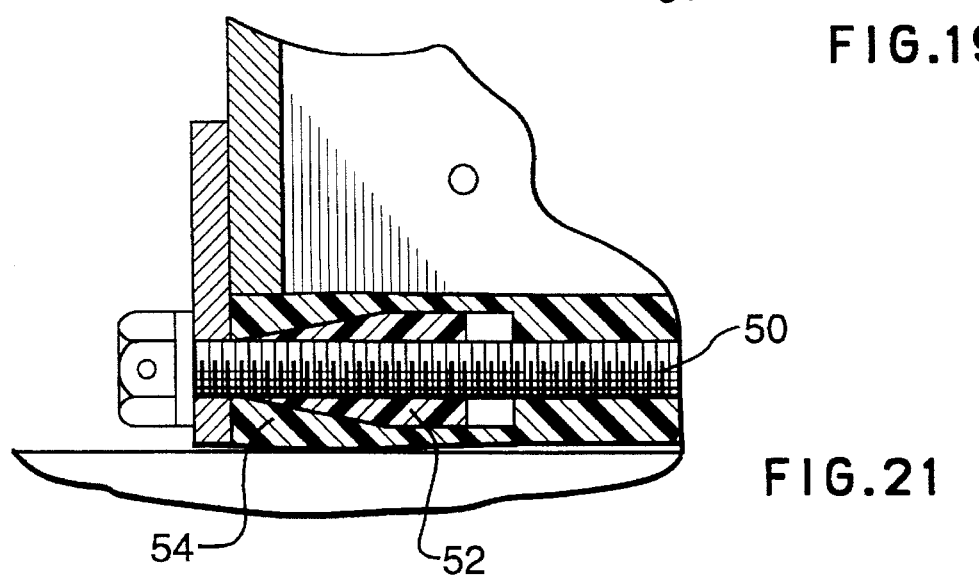
FIG.21

STACKABLE MODULAR PROJECTION TELEVISION DISPLAY SYSTEMS

BACKGROUND OF THE INVENTION

1. Field of the Invention

This invention relates to the field of commercial video displays.

Large video displays, produced by a number of individual display units arranged in a matrix, are used commercially for a variety of purposes, such as retail displays, electronic billboard advertising, scoreboard displays in sports arenas, or showing films or television programs to an audience. The signals to the individual displays are typically provided via a computer and specialized software which allows the image to be displayed and manipulated in a variety of intriguing ways, e.g. zooming in and out, splitting the image, displaying unrelated images on different individual units, displaying related images which combine to form a larger image, etc.

One disadvantage of using conventional television-type displays is that the screens are curved at their edges, producing large "black" areas between individual screens. Projection televisions have therefore become the display of choice, since they permit rectangular images to be presented. Even with projection units, however, there are black lines or borders between individual units. It is highly desirable to reduce the width of these borders as much as possible.

Rear projection systems are commonly used in such displays, but are quite deep. It is often desirable to have a display with much less depth, which can be achieved using a video projector mounted in a housing to project upwardly, with a mirror to direct the image forwardly onto a viewing screen.

2. Description of the Prior Art

Large video displays using video projectors are already known. Most use direct rear projection rather than mirror-reflected rear projection. Examples are the displays sold as Electrosonic Profile by Electrosonic Systems, Inc. of Minneapolis, Minn., and the Pioneer RM-V2000A system sold by Pioneer Electronic Corporation of Japan.

At least one system, sold by Hitachi and described as its Model CM100 100-inch Presentation System, uses mirror-reflected projection in a fixed 2×2 unit.

SUMMARY OF THE INVENTION

It is an object of this invention to provide stackable video projection display units which permit the assembly of multi-screen displays having very small borders between adjacent units.

In the invention, the video display unit has a box defined by peripheral frame members along each edge thereof, the box having front, rear, top, bottom and two side faces. Abutment surfaces are located on the peripheral frame members along the top and sides, for abutting corresponding abutment surfaces of other such display units. A video projector is mounted in a lower portion of the box, to project an image upwardly. A mirror is mounted in an upper portion of the box, angled to direct the image from the video projector forwardly towards an upper portion of the front face of the box. Three detachable mullions, namely an upper mullion and two side mullions, are mounted along top and side edges of the front face and extend slightly forwardly and outwardly therefrom. The mullions having longitudinal channels running the length thereof on opposite sides thereof, the mullions being symmetrical about longitudinal axes, the axes being parallel to the front face and aligned with respective ones of the abutment surfaces. A rectangular screen is mounted across the upper front portion of the front face, to receive the image from the video projector via the mirror, the screen extending across the front face between the mullions and being positioned in the channels. A hinged channel is provided along a lower edge of the screen, for locating and locking the screen into the channels of the upper and side mullions.

The video display unit is securable to other identical video display units, with adjacent units having a detachable mullion missing, such that they share a mullion. To build displays which are two screens high, one unit is inverted and positioned on top of the lower unit. Any number of units may be placed side to side to create a display of unlimited width.

Further features of the invention will be described or will become apparent in the course of the following detailed description.

BRIEF DESCRIPTION OF THE DRAWINGS

In order that the invention may be more clearly understood, the preferred embodiment thereof will now be described in detail by way of example, with reference to the accompanying drawings, in which:

FIG. 18 is a sectional side elevation view of a mechanism for jacking the video projector upward to secure it in its installed position;

FIG. 19 is a front view showing the video projector and jacking mechanism;

FIG. 20 is a close-up cross-section of the jacking mechanism;

FIG. 21 is a corresponding view, showing the jacking mechanism engaged to lift the video projector;

DETAILED DESCRIPTION OF THE PREFERRED EMBODIMENT

Figure 1:
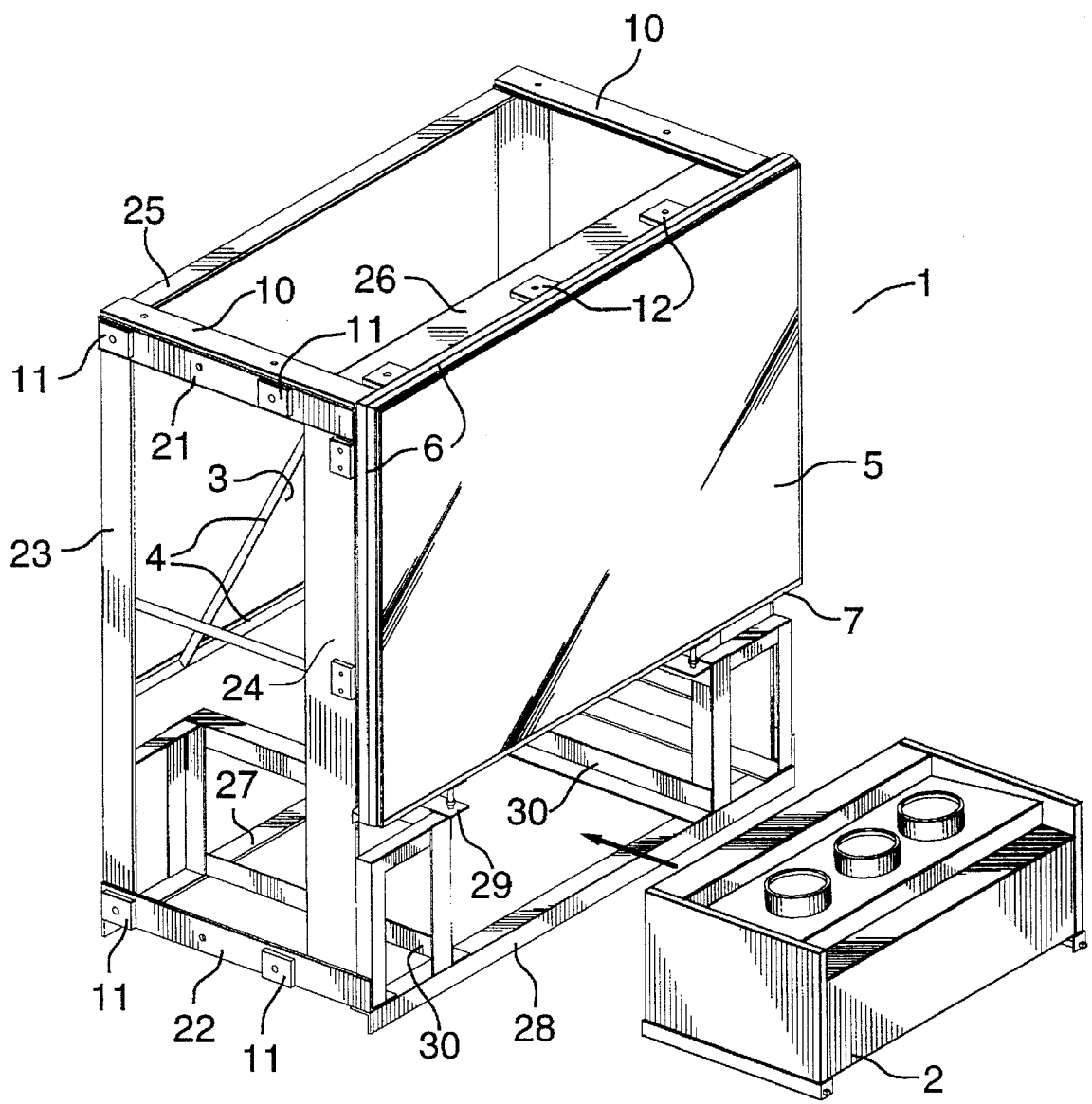
FIG. 1 is a perspective of one of the video display units, with side, front and top cover panels removed.
Figure 2:
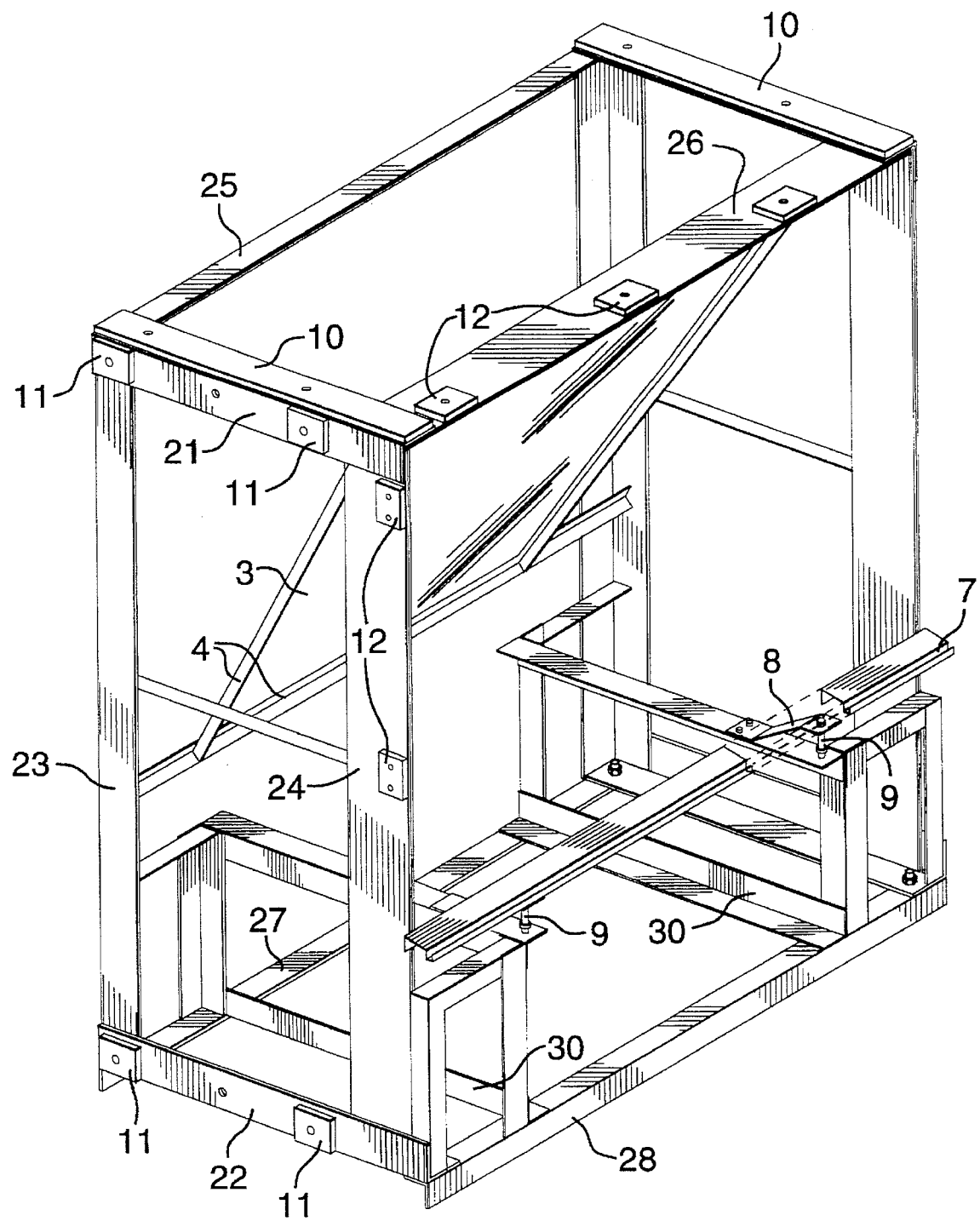
FIG. 2 is a perspective view similar to FIG. 1, but with the display screen also removed.
Figure 3:
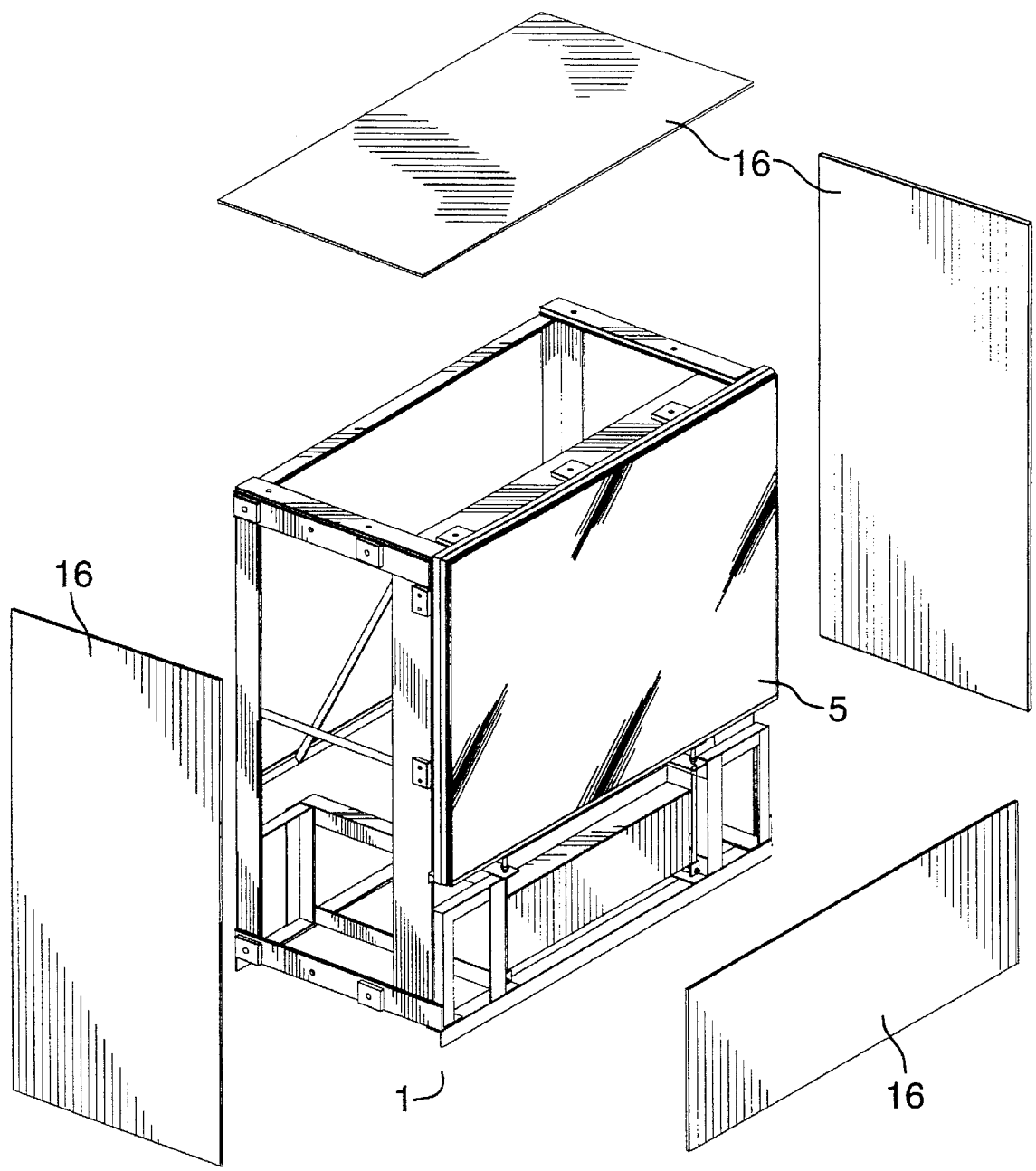
FIG. 3 is a perspective view similar to FIG. 1, showing side, front and top cover panels.

Referring to the drawings, FIGS. 1–3 show one of the video display units 1. The unit has a box defined by peripheral frame members along each edge thereof, namely an upper side edge frame piece 21, a lower side edge frame piece 22, a rear side edge frame piece 23, a front side edge frame piece 24, an upper rear edge frame piece 25, an upper front edge frame piece 26, a lower rear edge frame piece 27, and a lower front edge frame piece 28. The frame members provide sufficient structural integrity for stacking or suspending the units, either individually or as an assembled display of multiple units. The box has front, rear, top, bottom and two side faces. Abutment surfaces are located on the peripheral frame members along the top and sides, namely upper abutment strips 10 and lateral abutment blocks 11, for abutting corresponding abutment surfaces of other such display units when they are connected to each other. A video projector 2 is mounted in a lower portion of the box, between upper guide rails 29 and lower guide rails 30, to project an image upwardly. A mirror 3 is mounted in a mirror support frame 5 in an upper portion of the box, angled to direct the image from the video projector forwardly towards an upper portion of the front face of the box. Three detachable mullions 6, namely an upper mullion and two side mullions, are mounted along top and side edges of the front face and extend slightly forwardly and outwardly therefrom. A rectangular screen 5 is mounted across the upper front portion of the front face, to receive the image from the video projector via the mirror.

Figure 4:
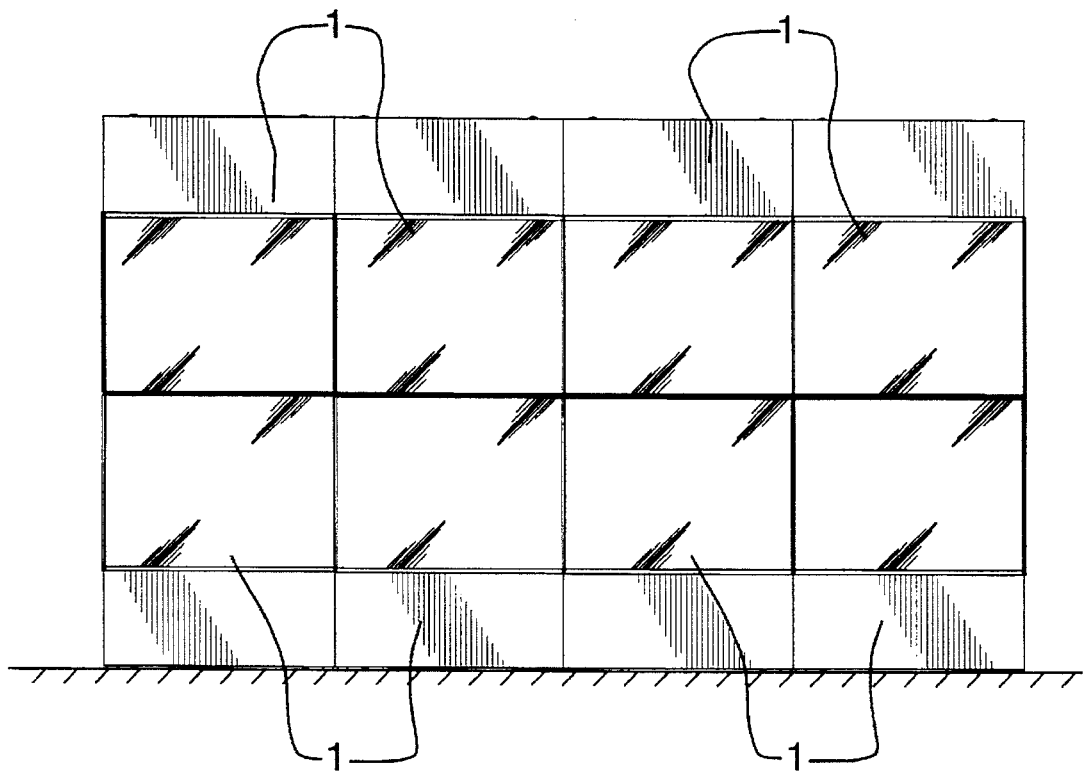
FIG. 4 is a front view of a 4×2 array of the units, as an illustrative example.
Figure 5:
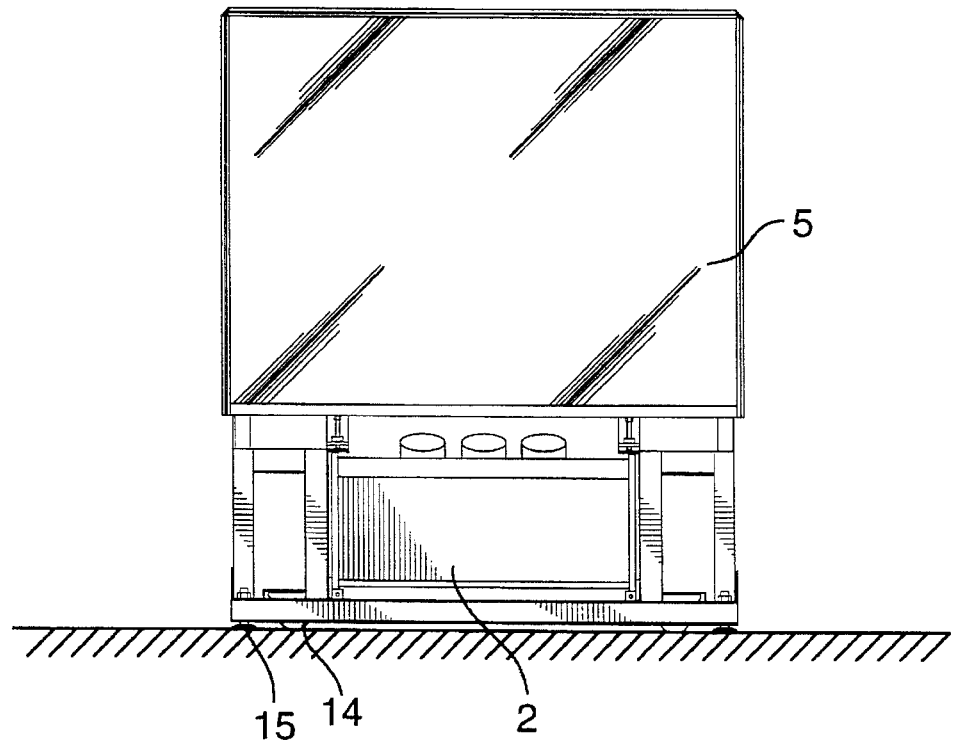
FIG. 5 is a front view of one of the units.

The video display unit is securable to corresponding video display units positioned with corresponding abutment surfaces abutting each other, with one each of the adjacent units having a detachable mullion missing, such that the two units share a mullion. To build displays which are two screens high, one unit is inverted and positioned on top of the lower unit. The displays cannot be more than two units high, but any number of units may be placed side to side. FIG. 4 is a front view of a 4×2 array of the units, as an illustrative example. Note that there is no need for a bottom unit to have a corresponding upper unit, e.g. there could be say six bottom units, but only three or four upper units.

As illustrated in FIG. 3, side, front and top cover panels 16 must be installed on the finished displays, except between abutting units, for aesthetic reasons and to eliminate ambient light interference.

Figure 6:
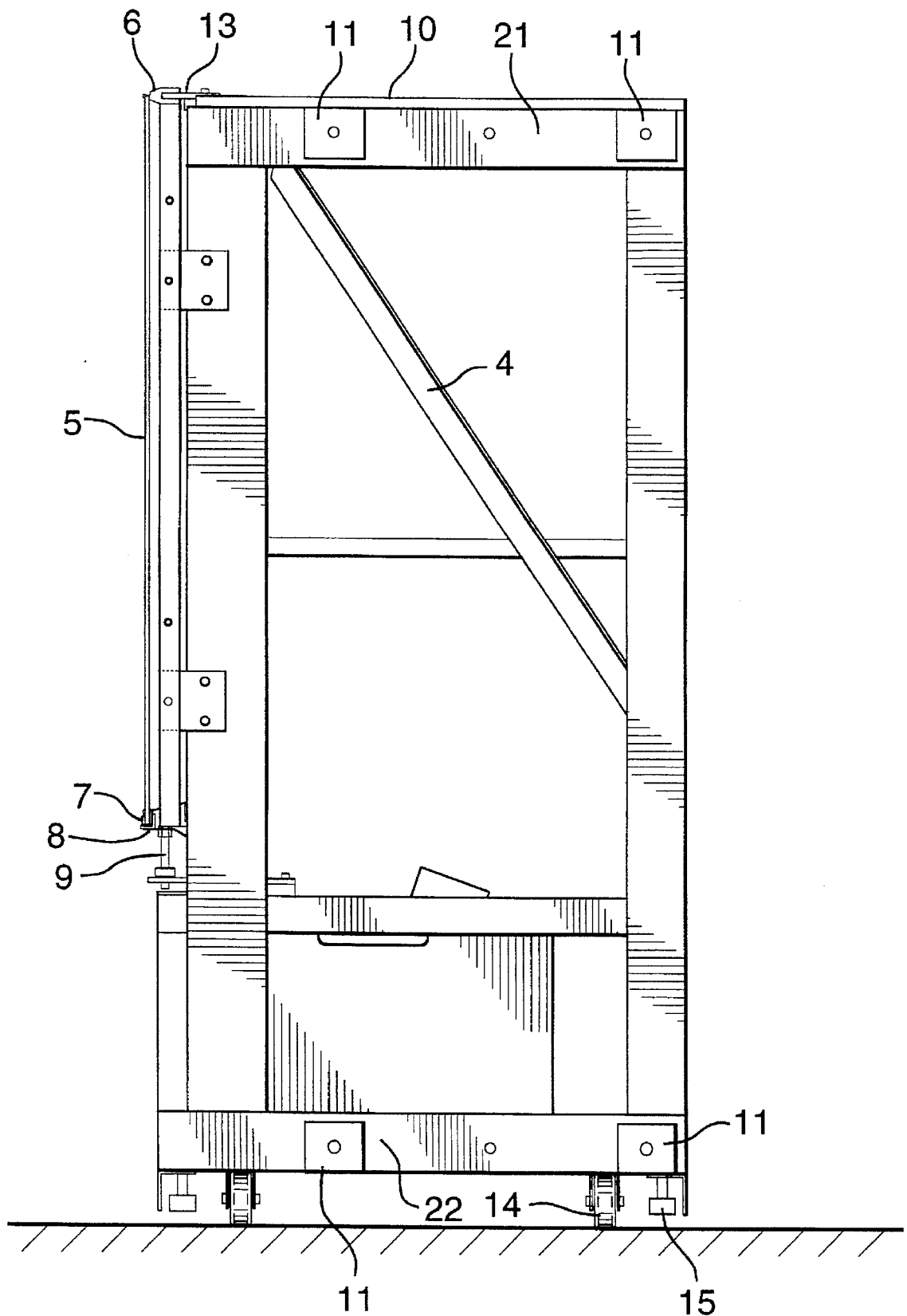
FIG. 6 is a side view of one of the units.
Figure 7:
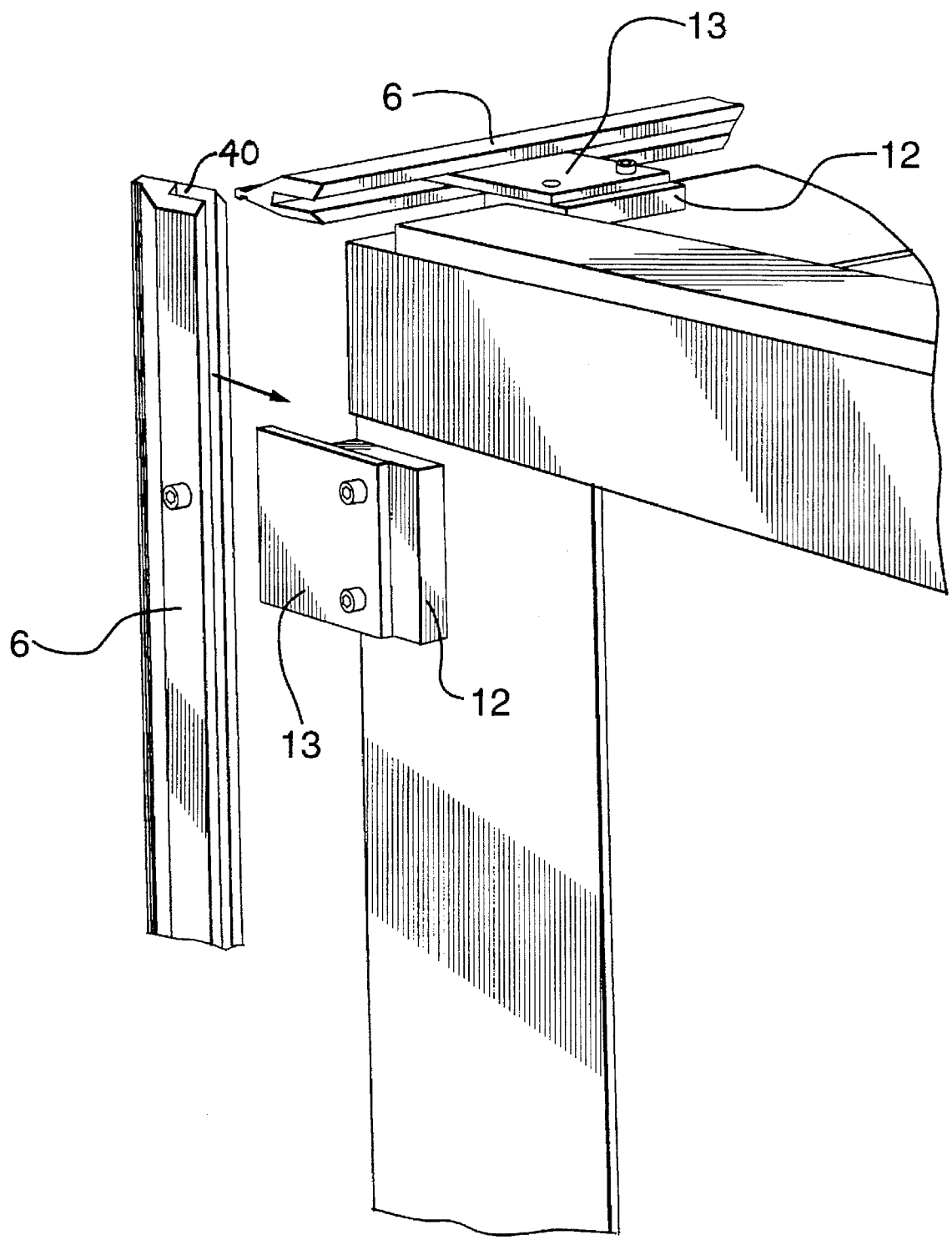
FIG. 7 is a perspective view of an upper front corner of one of the units, with a side mullion removed.
Figure 8:
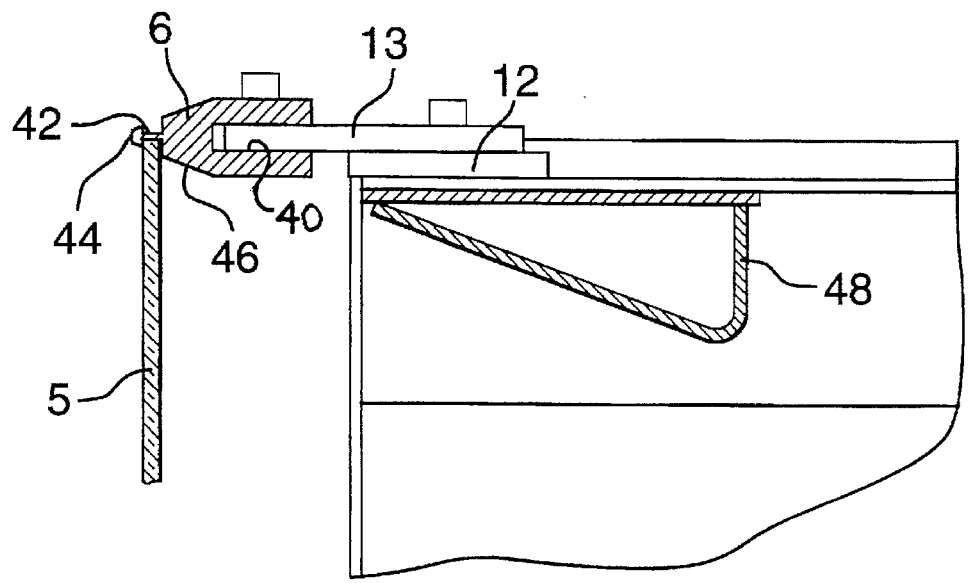
FIG. 8 is a sectional side elevation view of an upper front corner of one of the units.

As seen best in FIGS. 7 and 8, the mullions 6 are identical in cross-section, and preferably are of extruded plastic. The mullions have longitudinal channels 42 running the length thereof on opposite sides thereof. The mullions are symmetrical about longitudinal axes, the axes being parallel to the front face and aligned with respective ones of the abutment surfaces 10 or 11 as the case may be, as seen in FIG. 6. The screen 5 extends across the front face between the mullions and is positioned in the channels 42, which hold the screen in place on three sides. A channel mechanism is provided along the lower edge of the screen, for locating and locking the screen into the channels of the upper and side mullions, so that the screen is retained on all four sides.

Figure 11:
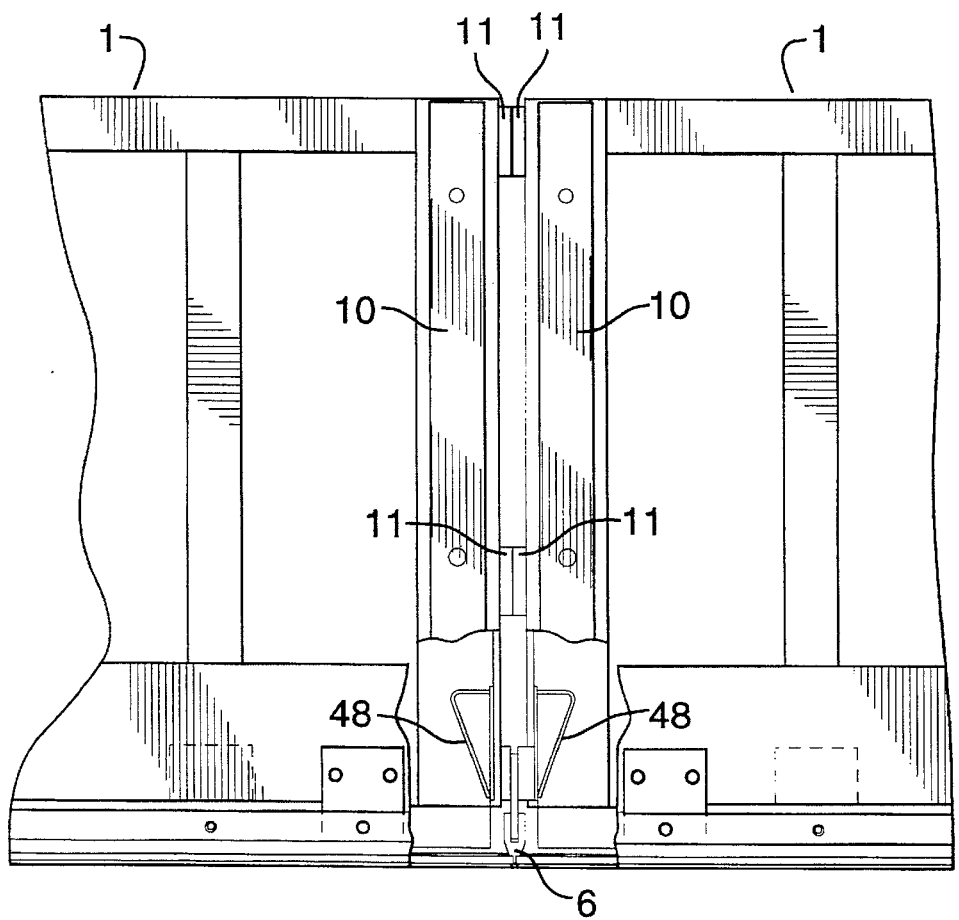
FIG. 11 is a top view corresponding to FIG. 10, showing the two units mated to each other and sharing a mullion.
Figure 17:
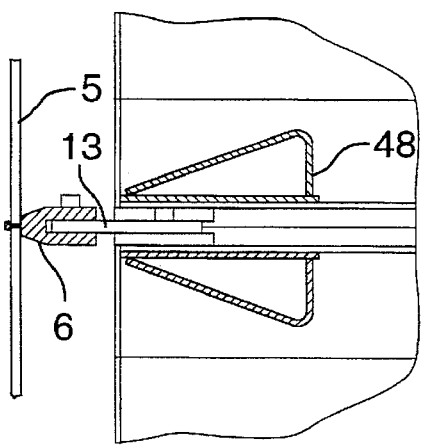
FIG. 17 is a close-up side elevation view of the area of the mullion shared by the two units.
Figure 16:
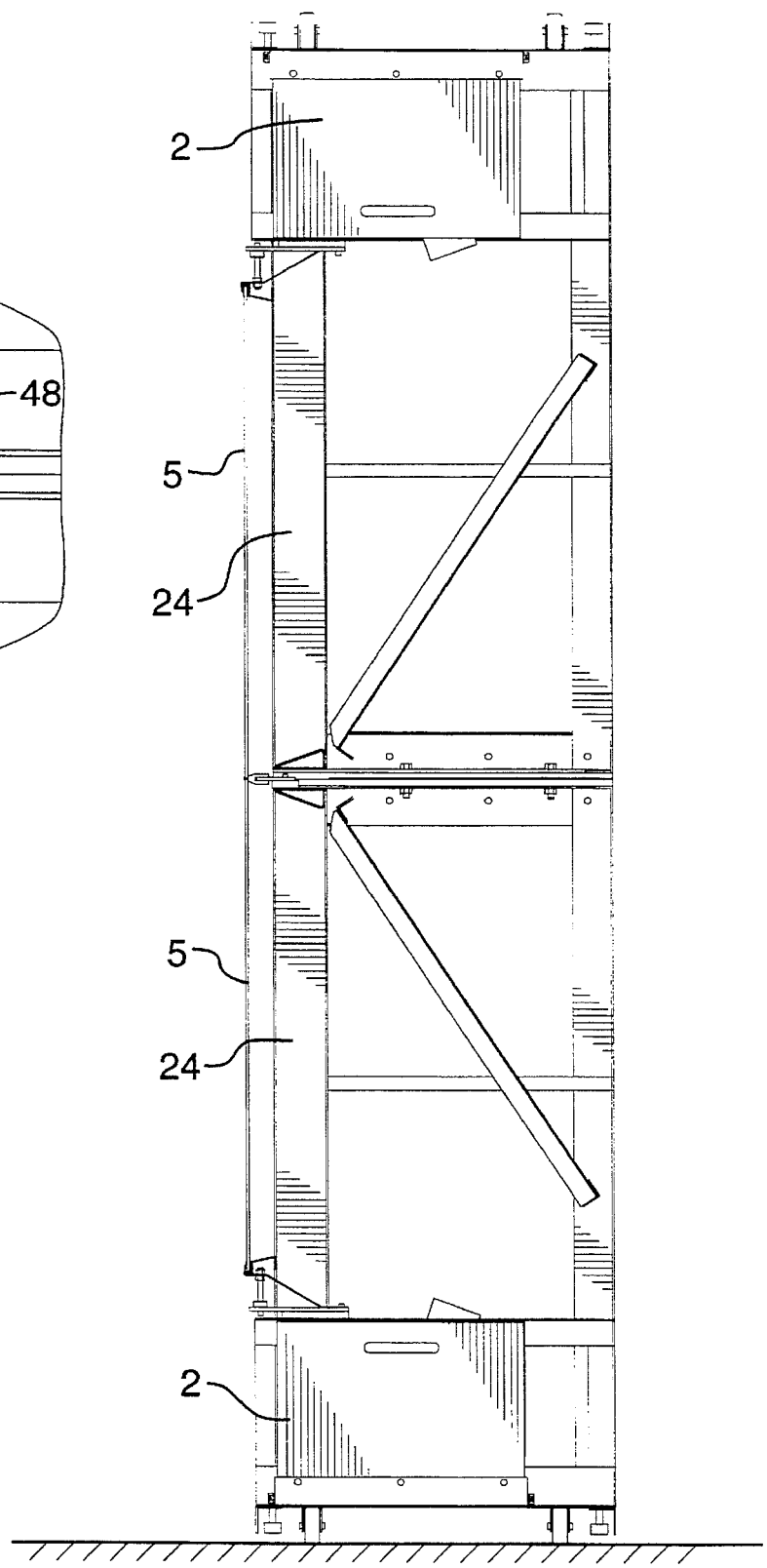
FIG. 16 is a side elevation view showing two units connected to each other, one above the other.

Each mullion has a U-shaped opening 40 which permits the mullion to be installed on a mullion support 13. The mullion support 13 is in turn installed onto a mullion support mounting block 12. As can be seen best in FIG. 8, the centerline of the mullion support 13 and thus of the mullion 6 aligns with the upper edge of the abutment strip 10. An important consequence of this alignment is that when two units are abutted to each other, as shown in FIGS. 11 and 17, they are able to share a mullion 6. This reduces the thickness of the border between adjacent screens.

Another important factor in reducing the thickness of the border is that the mullion has angled sides 46, which taper the mullions down to a very narrow mullion tip 44. The angle of the angled sides corresponds to the angle of the image projected to the screen via the mirror.

With this configuration, it has been possible to achieve a border thickness, i.e. mullion tip width, of only 4 mm.

Shields 48, at the same angle, are provided to prevent the image from one video projector from overlapping with the image from an adjacent video projector.

Figure 9:
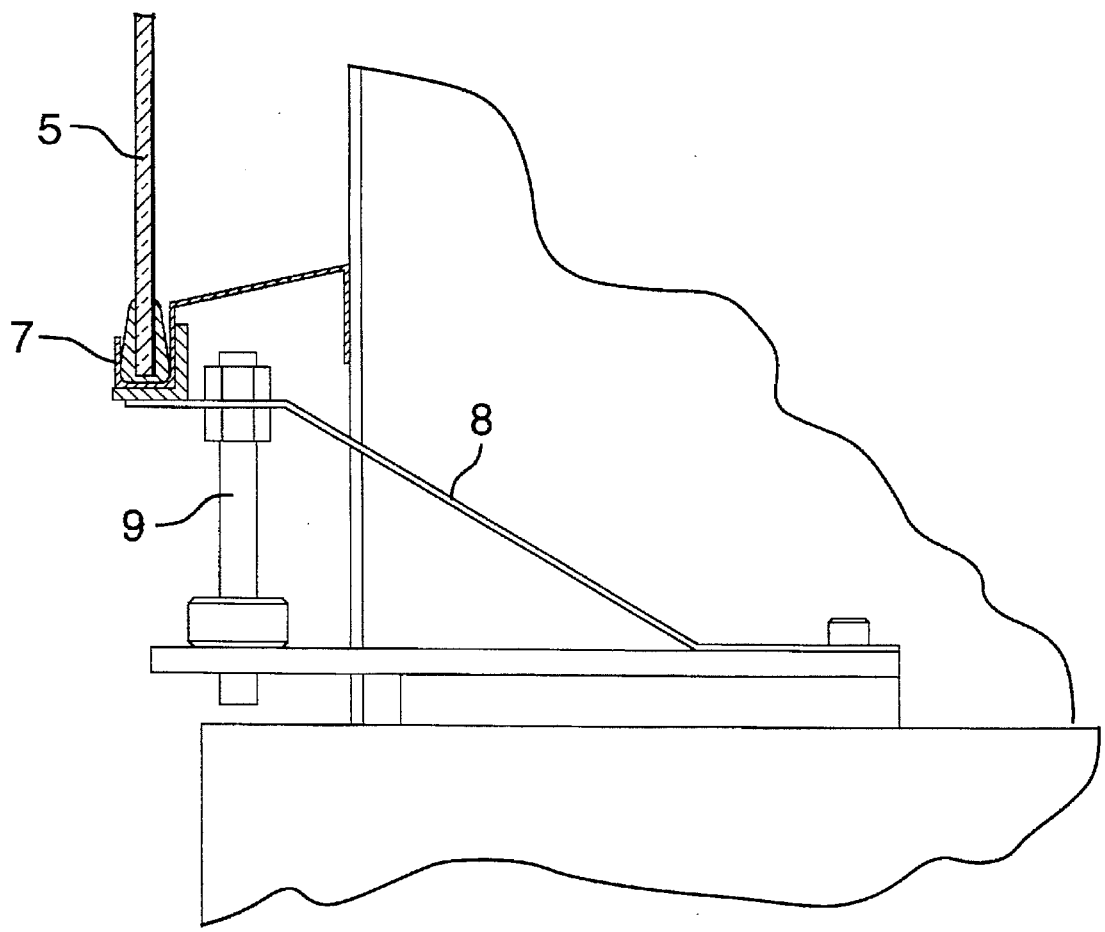
FIG. 9 is a sectional side elevation view of the area near the bottom of the screen, showing the screen locating means.
Figure 10:
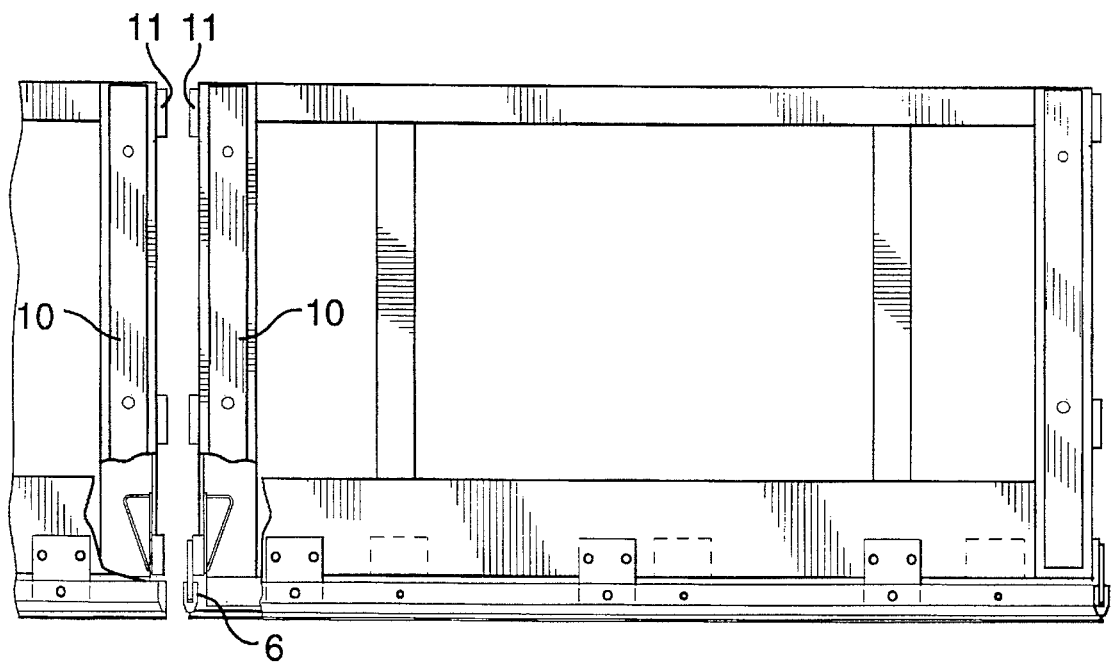
FIG. 10 is a top view, showing two units aligned with each other for mating.

The locating means for the screen is best seen in FIG. 9. A screen locating bracket 7 is supported by a support 8 which is able to move up and down somewhat, by virtue of its cantilevered configuration and inherent limited flexibility. Two height adjustment screws 9 allow the support to be moved up and down as required.

Figure 12:
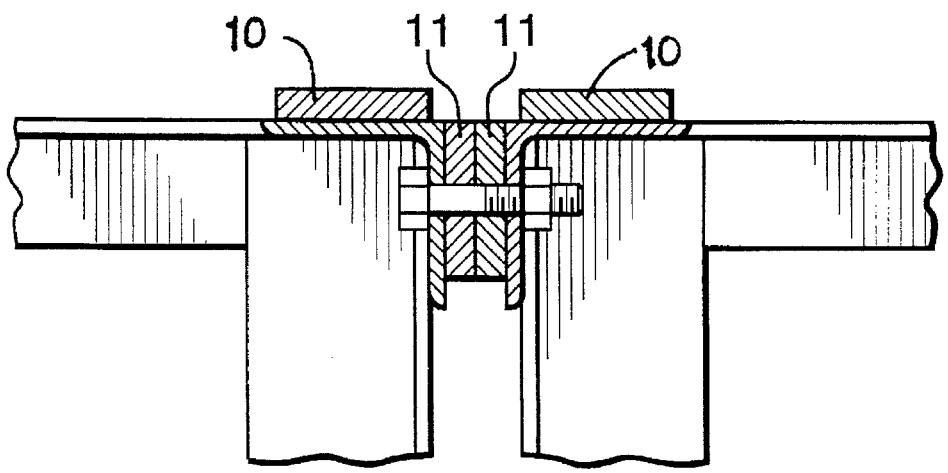
FIG. 12 is a sectional elevation view of the upper portion of the two units where they are mated.
Figure 13:
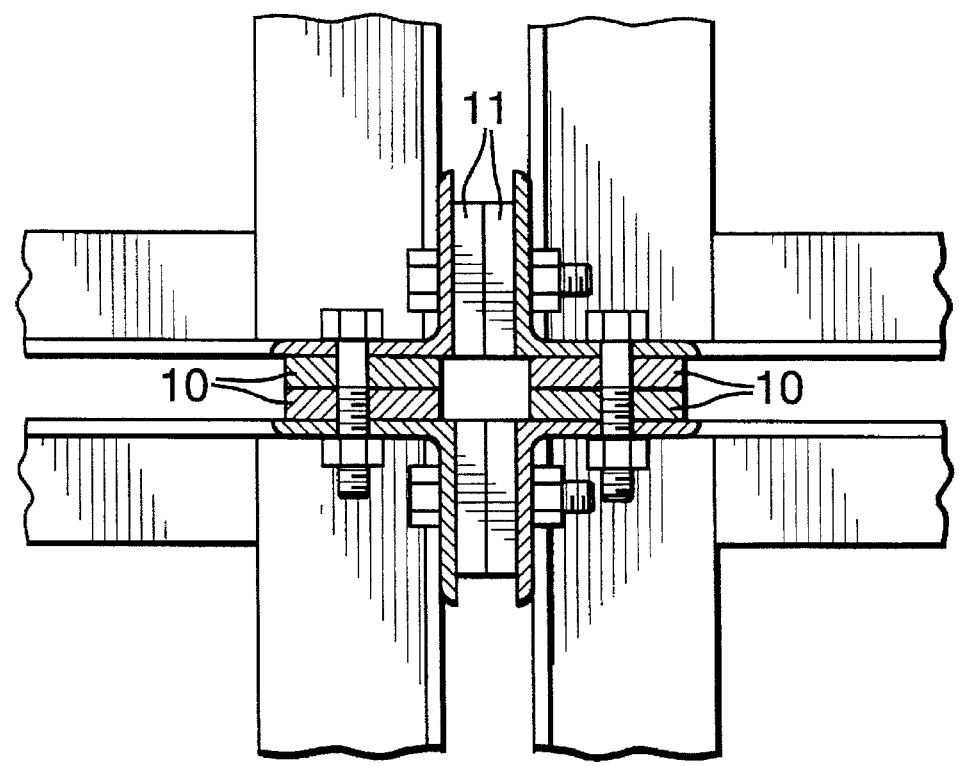
FIG. 13 is a corresponding elevation view showing four units connected together.
Figure 14:
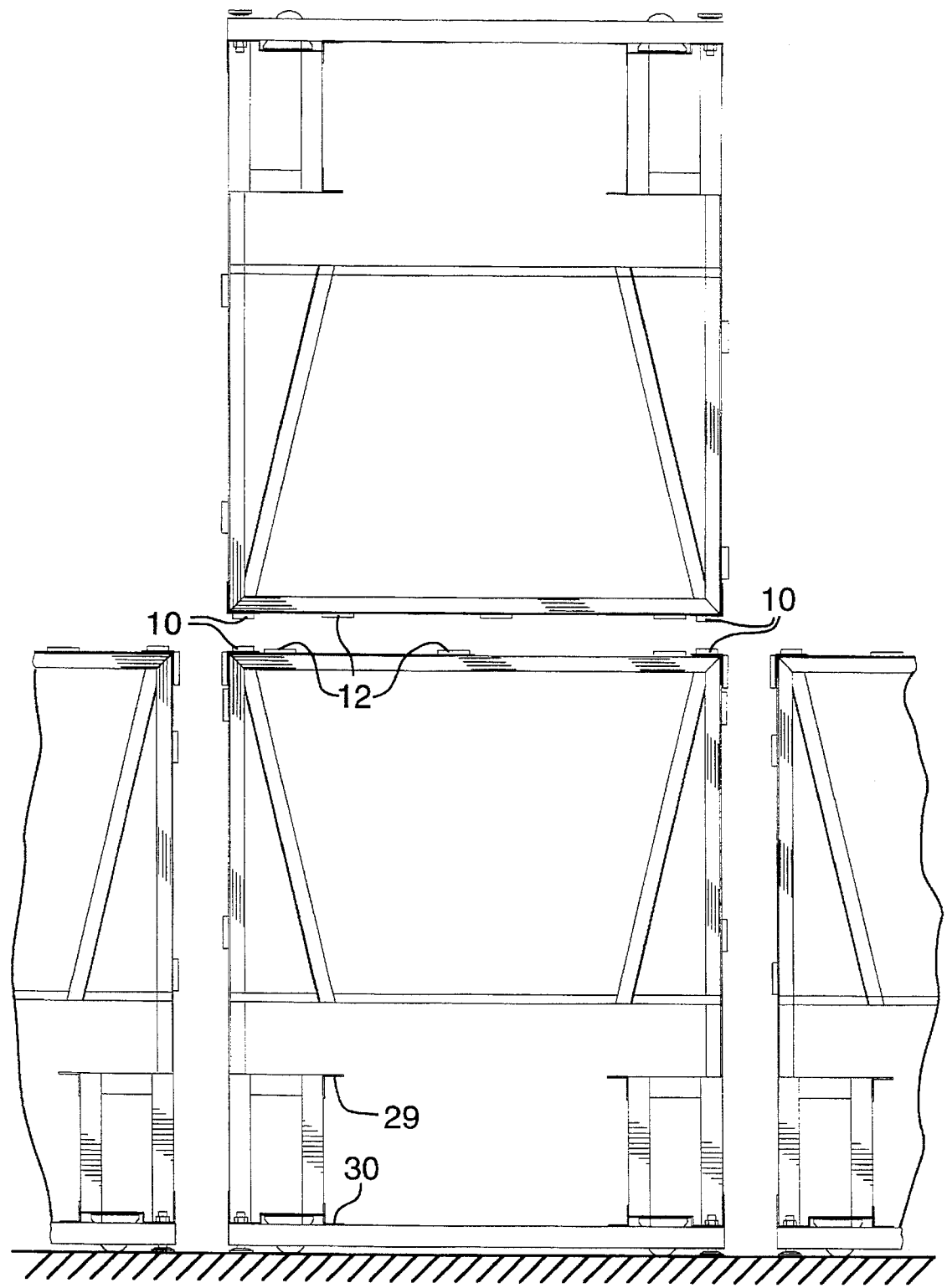
FIG. 14 is a front view showing multiple units in position for connection together.
Figure 15:
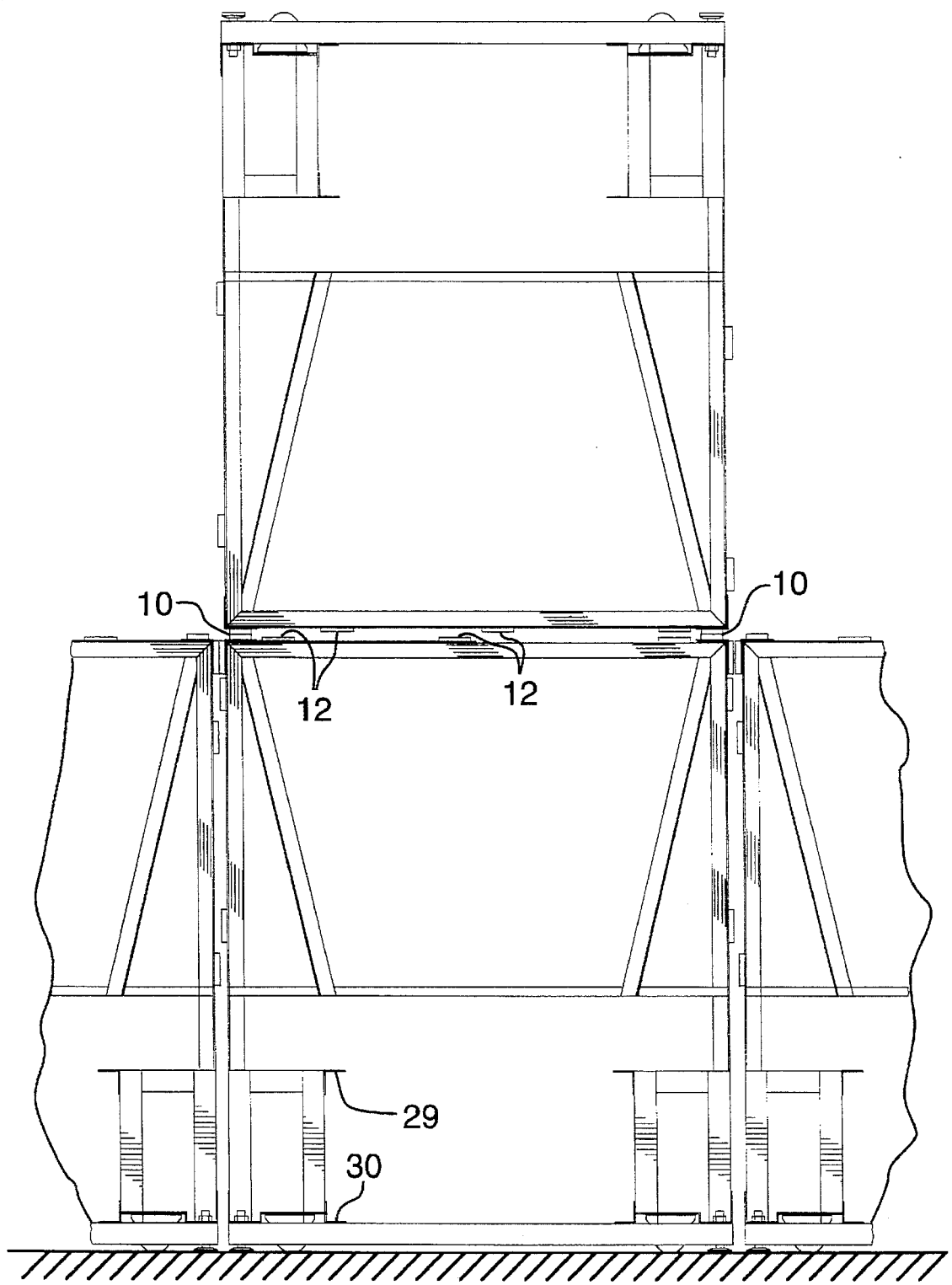
FIG. 15 is a corresponding view showing the units connected together.

FIGS. 12 and 13 show typical bolted connections between adjacent units to make up a display. The solid construction of the frames of the units and the secure connections between the units permit the display to be suspended from a ceiling or mounted off a wall, if so desired.

As seen in FIGS. 6 and 14–16, each unit has casters 14 which permit the units to be moved around quite easily when desired. Levelling legs 15 are lowered when desired, to anchor and level the units.

The video projector 2 is mounted between upper guide rails 29 and lower guide rails 30, as mentioned previously. The projector is simply pushed into position along the guide rails. However, it is obviously important to secure the projector in place, so that it cannot move around after installation. On the other hand, it must be easy to remove the projector when desired, for maintenance purposes or otherwise. FIGS. 18–21 show the mechanism by which this is achieved. Essentially, a jacking mechanism is provided to force the projector against the upper guide rails 29 so that it is clamped in place. A jacking screw 50, when rotated, moves wedges 52 axially to move anvils 54 farther from or closer to each other, to force the projector against the upper guide rails or to release the projector for removal.

It is a particular advantage of the invention that the video projector can be easily removed from either front or back of the unit. The jacking mechanism can be operated from either the front or the back, as can be seen from FIG. 18. Therefore, the projector can easily be removed from either front or back, simply by sliding out along the guide rails. This is important in permitting easy access not only for displays which are installed against a wall facing outwardly from the wall, but also for displays which may be installed with their fronts inaccessible, e.g. where the display is against a window.

Figure 22:
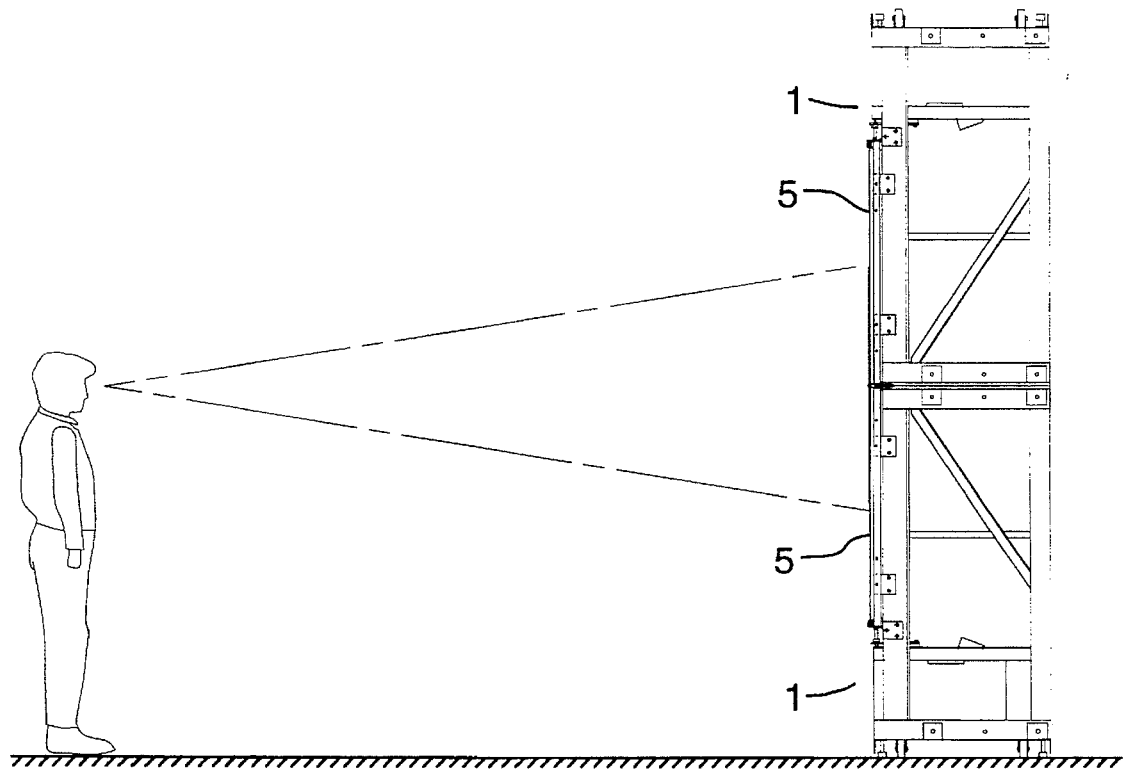
FIG. 22 is a side elevation view showing a person viewing two normally-installed units, one above the other.
Figure 23:
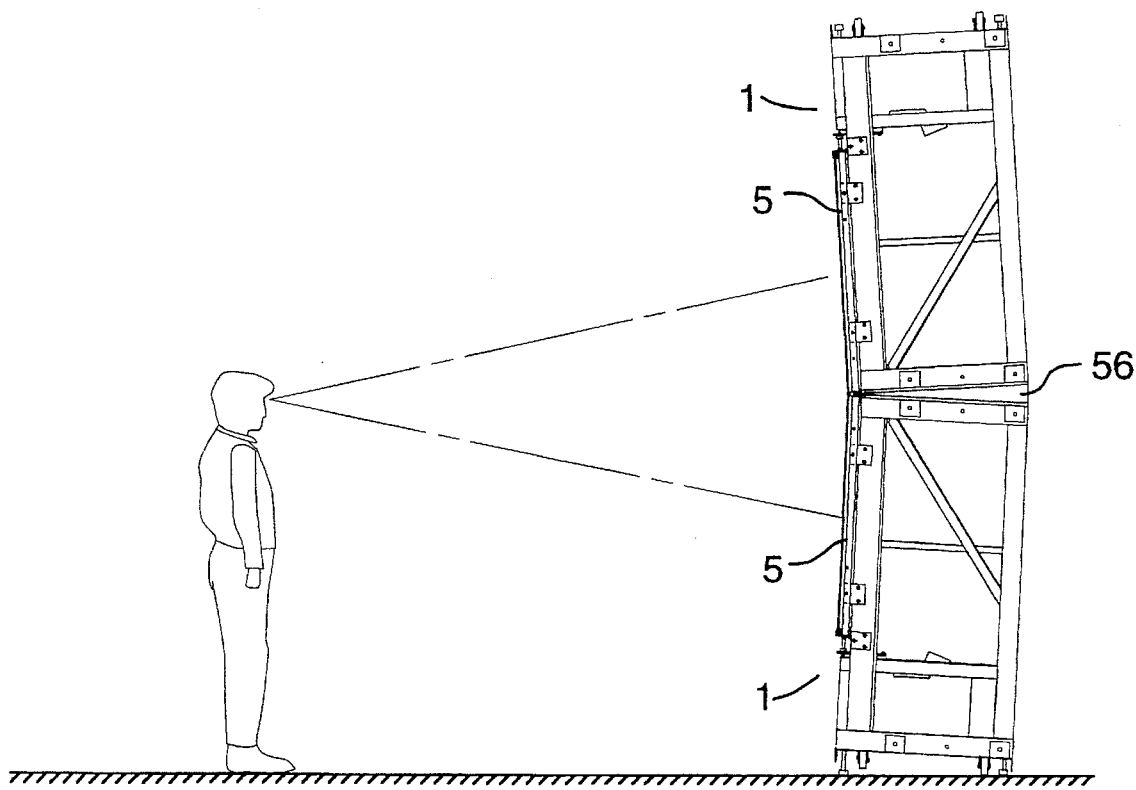
FIG. 23 is a corresponding view showing the person viewing the two units, with the units angled for better viewing.

Another feature of the units is that angles may be adjusted as shown in FIG. 23 to optimize the quality of the image for the viewer. FIG. 22 shows a person viewing two normally-installed units, one above the other. However, since optimum brightness of the image as achieved when each unit faces directly towards the viewer, it is advantageous to be able to angle the units as illustrated in FIG. 23. The lower unit or units can be angled slightly upwardly, by using the levelling legs 15, and the upper unit or units can be angled slightly forwardly by inserting wedges 56 between lower and upper units. Where the upper and lower units are normally bolted at the rear, longer bolts are used, and the bolt holes are slightly elongated to accommodate the slight change in alignment which the wedges produce. The bolts pass through holes in the wedges.

It will be appreciated that the above description relates to the preferred embodiment by way of example only. Many variations on the invention will be obvious to those knowledgeable in the field, and such obvious variations are within the scope of the invention as described and claimed, whether or not expressly described.

What is claimed as the invention is:

1. A video display unit, comprising:

a box defined by peripheral frame members along each edge thereof, said box having front, rear, top, bottom and two side faces;

abutment surfaces on said peripheral frame members along said top and sides, for abutting corresponding abutment surfaces of other such display units;

a video projector mounted in a lower portion of said box, to project an image upwardly;

a mirror mounted in an upper portion of said box, angled to direct said image from said video projector forwardly towards an upper portion of said front face of said box;

three detachable mullions, namely an upper mullion and two side mullions, mounted along top and side edges of said front face and extending slightly forwardly and outwardly therefrom, said mullions having longitudinal channels running the length thereof on opposite sides thereof, said mullions being symmetrical about longitudinal axes, said axes being parallel to said front face and aligned with respective ones of said abutment surfaces;

a rectangular screen mounted across said upper front portion of said front face, to receive said image from said video projector via said mirror, said screen extending across said front face between said mullions and being positioned in said channels; and a locating and locking channel along a lower edge of said screen, for locating and locking said screen into said channels of said upper and side mullions; said video display units being securable to one or more corresponding video display units positioned with corresponding abutment surfaces abutting each other, upon removal of one of said detachable mullions between each said video display unit, such that abutting video display units share a mullion, the screens of said abutting video display units being accommodated in said channels on opposite sides of said shared mullion.

2. A video display unit as recited in claim 1, where said mullions are tapered to provide a maximum width of approximately 4 mm forward of the screen, such that the maximum width of a border between adjacent screens is approximately 4 mm.

3. A video display unit as recited in claim 1, where said video projector is slidably mounted within said box between upper and lower guide rails on either side thereof, such that it may be removed by sliding either forwardly or rearwardly, said unit further comprising locking means for locking said video projector to prevent such forward or rearward sliding.

4. A video display unit as recited in claim 3, where said locking means comprises jacking means for displacing said video projector towards a pair of said rails to clamp said video projector against said rails, said jacking means being operable from either the front or the rear of the video display unit.

5. A video display system, comprising a plurality of video display units as recited in claim 1, said video display units being secured to each other in at least one and not more than two horizontal rows of video display units, with video display units in any upper row being inverted such that said video display units are positioned with corresponding abutment surfaces abutting each other, upon removal of one of said detachable mullions between each said video display unit, such that abutting video display units share a mullion, the screens of said abutting video display units being accommodated in said channels on opposite sides of said shared mullion.

* * * * *